(12) United States Patent
Clough (10) Patent No.: US 7,988,235 B2
(45) Date of Patent: Aug. 2, 2011

(54) RETRACTABLE FOOTREST

(76) Inventor: Robert Clough, Santa Clarita, CA (US)

( * ) Notice: Subject to any disclaimer, the term of this patent is extended or adjusted under 35 U.S.C. 154(b) by 226 days.

(21) Appl. No.: 12/456,109

(22) Filed: Jun. 9, 2009

(65) Prior Publication Data

US 2009/0322139 A1 Dec. 31, 2009

Related U.S. Application Data

(63) Continuation-in-part of application No. 12/221,378, filed on Aug. 1, 2008, now abandoned, and a continuation-in-part of application No. 11/789,844, filed on Apr. 25, 2007, now abandoned.

(51) Int. Cl.
*A47C 7/50* (2006.01)
(52) U.S. Cl. .......... 297/423.15; 297/423.19; 297/423.35
(58) Field of Classification Search ............. 297/423.15, 297/423.19, 423.26, 423.35, 452.63, 423.21, 297/423.25, 423.27
See application file for complete search history.

(56) References Cited

U.S. PATENT DOCUMENTS

| | | | | | |
|---|---|---|---|---|---|
| 3,375,039 | A | * | 3/1968 | Gielow et al. | 297/423.15 |
| 3,462,194 | A | * | 8/1969 | Gielow et al. | 297/423.15 |
| 3,632,169 | A | * | 1/1972 | Barecki et al. | 297/423.15 |
| 5,244,193 | A | * | 9/1993 | Hehr | 269/99 |
| 6,375,266 | B1 | * | 4/2002 | Ferguson et al. | 297/423.15 |
| 7,108,329 | B1 | * | 9/2006 | Clough | 297/423.19 |
| 2003/0075966 | A1 | * | 4/2003 | Behnert | 297/423.26 |

* cited by examiner

*Primary Examiner* — Sarah B McPartlin
(74) *Attorney, Agent, or Firm* — James E. Brunton (57) ABSTRACT

A vehicle seat that embodies a foot support assembly that is movable from a stowed position proximate the seat back to a deployed position wherein the assembly extends rearwardly of the seat. The foot support assembly of the vehicle seat includes a sub-assembly that comprises a pair of side-support members that support a footrest, the sub-assembly being positioned so as to automatically pivot downwardly as the foot support assembly is moved into its deployed position. The footrest is pivotally connected to the pair of side-support members for movement from a stowed position between the side-support members to a deployed position wherein it extends outwardly from the side-support members.

11 Claims, 10 Drawing Sheets

RETRACTABLE FOOTREST

CROSS-REFERENCE TO RELATED APPLICATIONS

This is a Continuation-In-Part of U.S. Ser. No. 12/221,378 filed Aug. 1, 2008 now abandoned and U.S. Ser. No. 11/789,844 filed Apr. 25, 2007, now abandoned.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to seating. More particularly, the invention concerns a vehicle seat embodying a novel, retractable foot support assembly.

DESCRIPTION OF RELATED ART INCLUDING INFORMATION DISCLOSED UNDER 37 CFR 1.97 AND 1.98

Not Applicable

BRIEF SUMMARY OF THE INVENTION

It is an object of the present invention to provide a novel vehicle seat that embodies a foot support assembly that is movable from a stowed position proximate the seat back to a deployed position wherein the assembly extends rearwardly of the seat.

Another object of the invention is to provide a vehicle seat as described in the preceding paragraph that includes a novel connector means for connecting the foot support assembly to the vehicle seat that yieldably resists movement of the foot support assembly toward the deployed position. Another object of the invention is to provide a vehicle seat of the aforementioned character in which the foot support assembly includes a sub-assembly that comprises a pair of side-support members that support a footrest, the sub-assembly being positioned so as to automatically pivot downwardly as the foot support assembly is moved into its deployed position.

Another object of the invention is to provide a vehicle seat of the character described in the preceding paragraph in which the footrest is pivotally connected to the pair of side-support members for movement from a stowed position between the side-support members to a deployed position wherein it extends outwardly from the side-support members.

Another object of the invention is to provide a vehicle seat of the class described that is of a simple construction that can be easily and inexpensively manufactured.

Another object of the invention is to provide a vehicle seat as described in the preceding paragraphs that is easy to install, requires little maintenance and is highly reliable in operation.

DETAILED DESCRIPTION OF THE INVENTION

Figure 1:
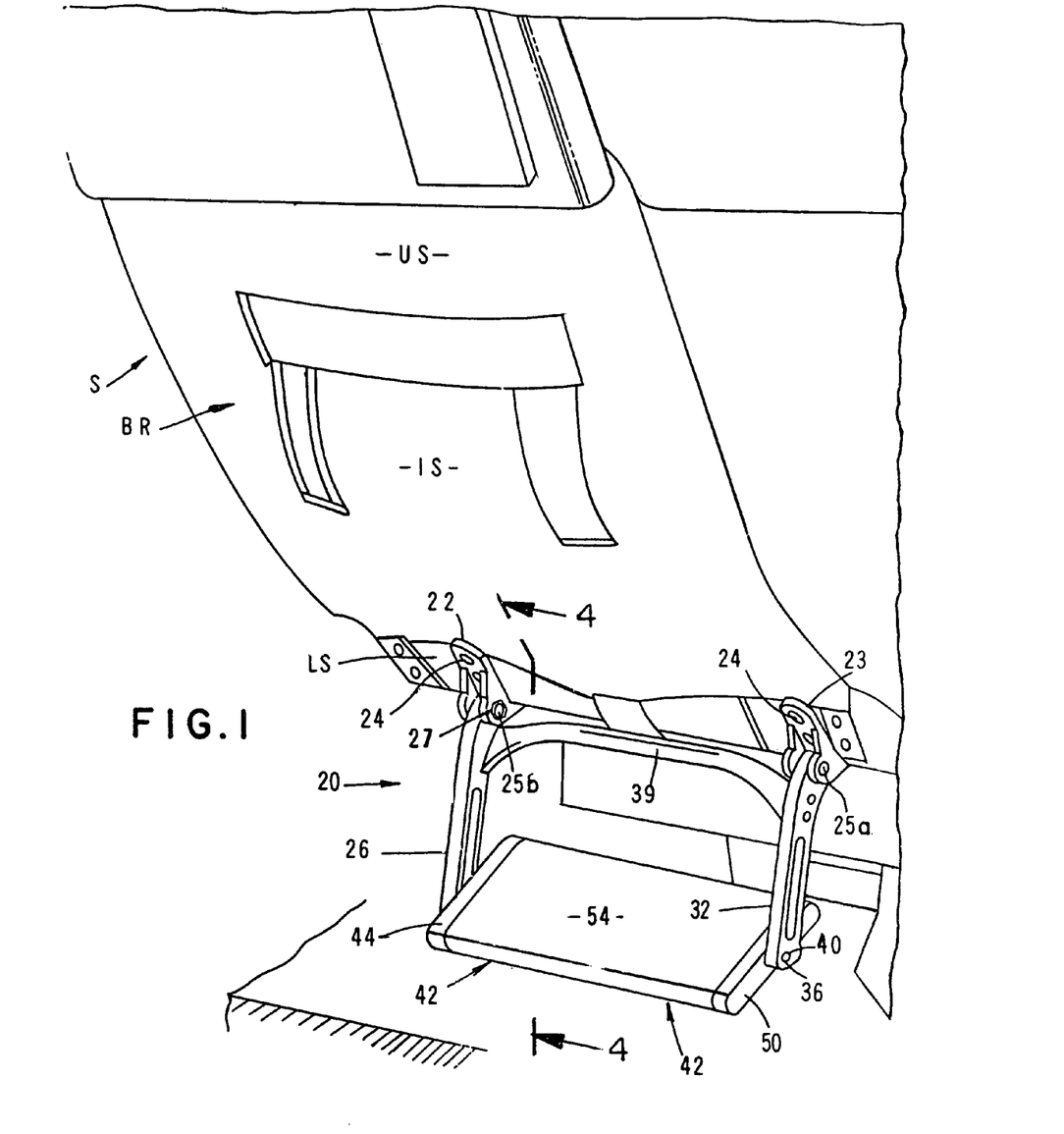
FIG. 1 is a fragmentary, generally perspective, rear view of an aircraft passenger seat showing the footrest assembly of the invention interconnected with the passenger seat and moved into a deployed position.
Figure 2:
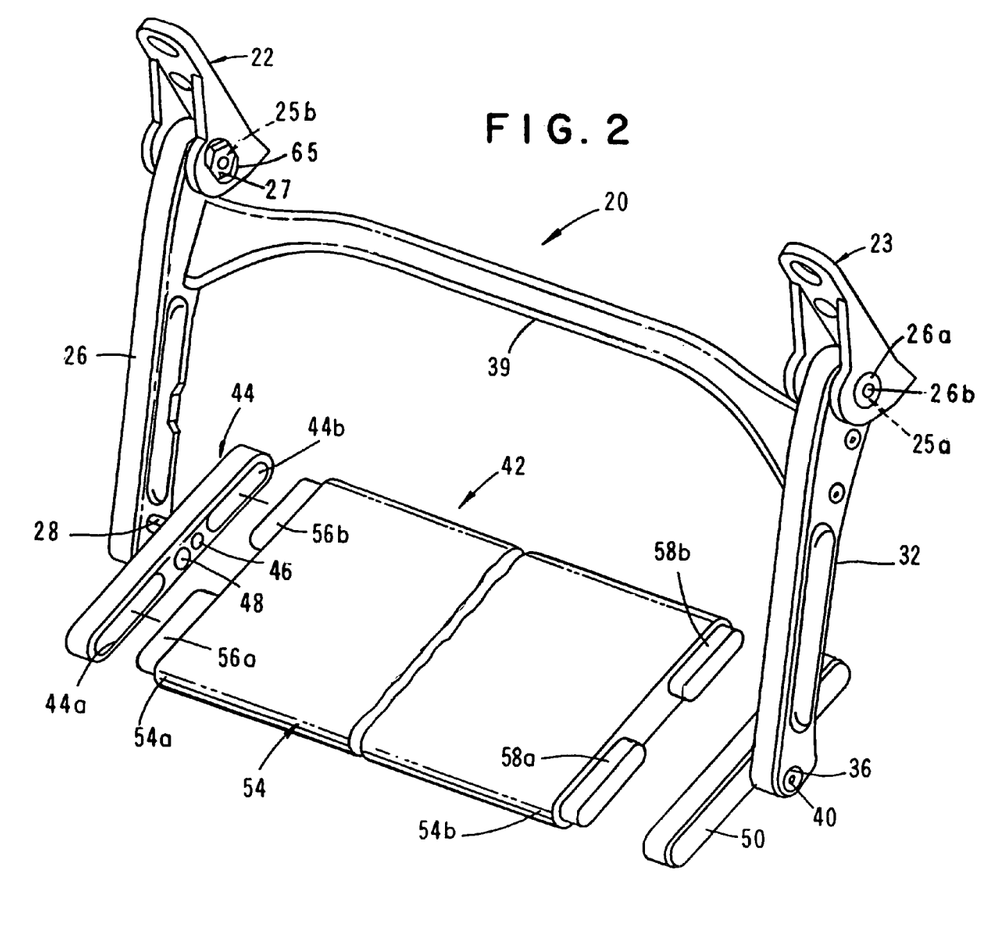
FIG. 2 is a generally perspective, partially exploded view of the form of the footrest assembly of the invention illustrated in FIG. 1.
Figure 3:
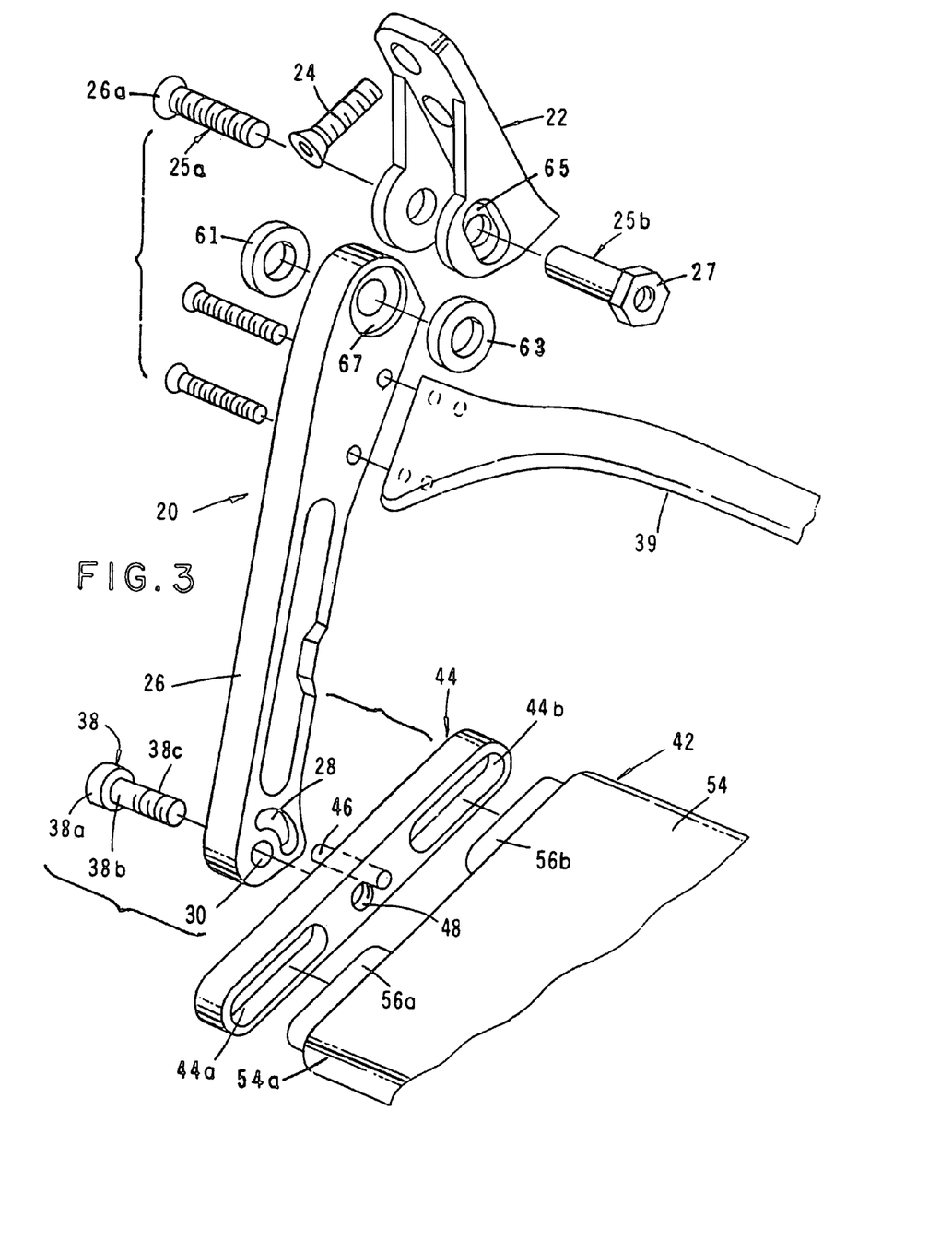
FIG. 3 is a greatly enlarged, generally perspective, partially exploded view of the left hand portion of the footrest assembly shown in FIG. 2.
Figures 4, 5, 6:
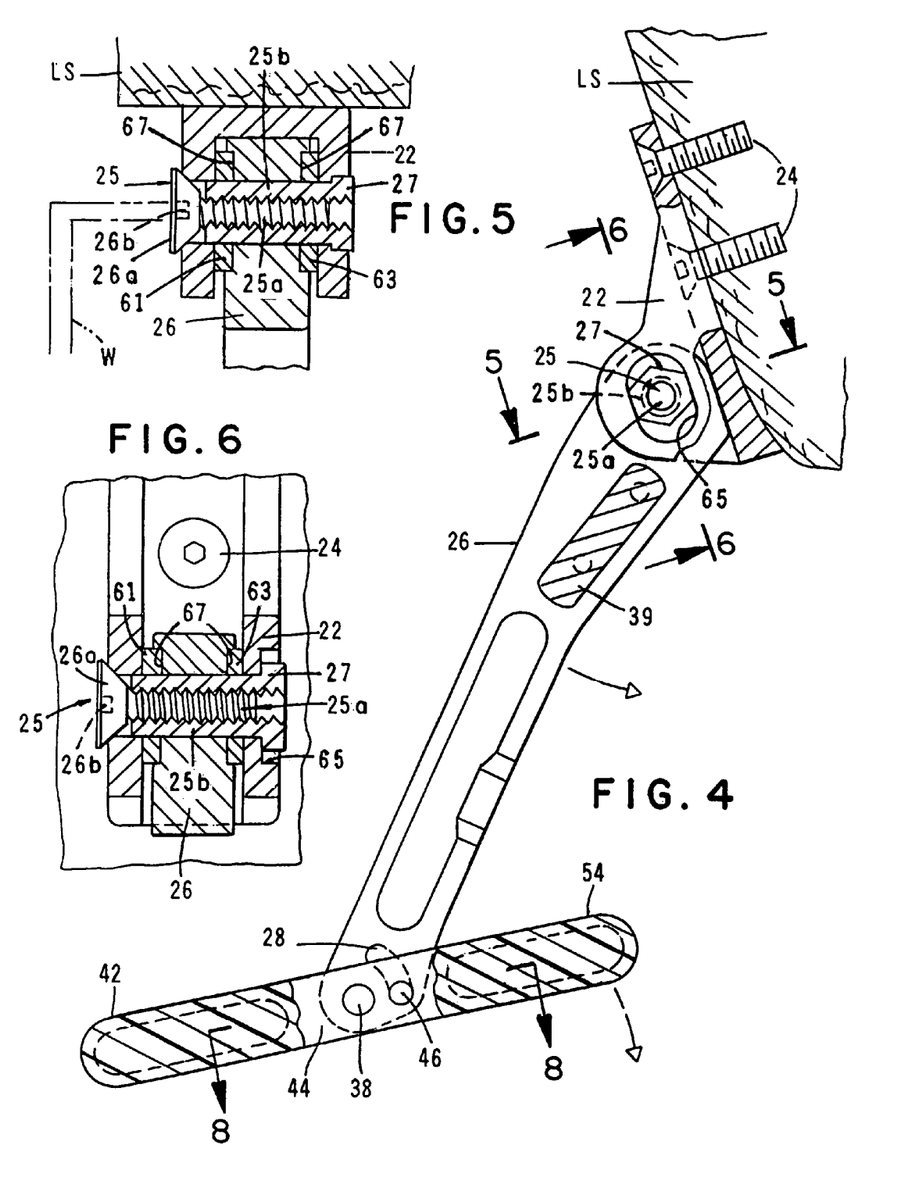
FIG. 4 is an enlarged, cross-sectional view taken along lines 4-4 of FIG. 1.
FIG. 5 is an enlarged, cross-sectional view taken along lines 5-5 of FIG. 4.
FIG. 6 is an enlarged, cross-sectional view taken along lines 6-6 of FIG. 4.

Referring to the drawings and particularly to FIGS. 1 through 3, one form of the footrest of the invention is there shown and generally designated by the numeral 20. The footrest of this form of the invention is designed to be used in combination with an aircraft passenger seat "S" that includes a backrest "BR" having a rear upper surface "US", a rear lower surface "LS" and a rear intermediate surface "IS". As best seen in FIG. 1, the footrest here comprises first and second spaced-apart connector brackets 22 and 23 that are connected to the rear lower surface "LS" of the passenger seat "S" by conventional threaded connectors 24 (FIGS. 3 and 4). Pivotally connected to first connector bracket 22 by means of a conventional two-part connector assembly 25 is a first side member 26 that is movable relative thereto between a first lowered position shown in FIG. 1 and a second upraised position shown in FIG. 7. For a purpose presently to be described, first side member 26 is provided with an arcuate-groove 28 and a through-bore 30 having an enlarged diameter portion 30a and a reduced diameter portion 30b (FIG. 8).

Pivotally connected to second connector bracket 23 is a second side member 32 that is movable along with first side member 26 between a first lowered position and a second upraised position. Second side member 32 is also provided with a through-bore 36 that is of similar configuration to through-bore 30. A cross brace 39 is connected to and spans members 26 and 32 (FIGS. 1 and 2).

Also forming a part of the footrest of the present invention are first and second pivot pins 38 and 40. Pivot pin 38 has a head portion 38a, a shank portion 38b and a threaded end portion 38c. As shown in FIGS. 3 and 8, pivot pin 38 is receivable within the through-bore 30 of the first side member 26, so that the head portion 38a resides within enlarged diameter portion 30a and the shank portion 38b resides within reduced diameter portion 30b. Second pivot pin 40, which is of similar construction to pivot pin 38, is receivable within the through-bore 36 of the second side member 32 in the manner indicated in FIG. 2.

Figures 7, 8:
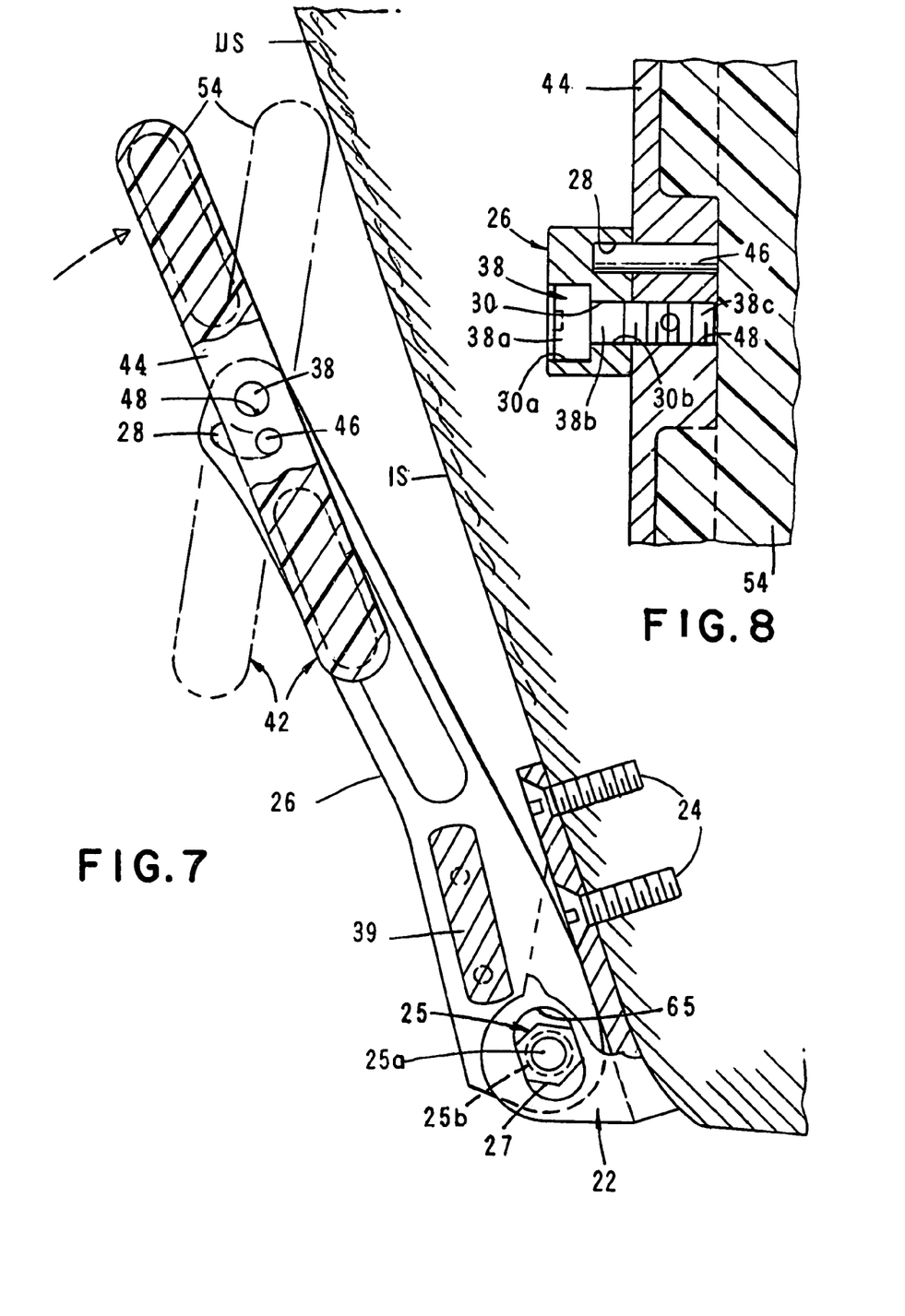
FIG. 7 is an enlarged, cross-sectional view, similar to FIG. 4, but showing the footrest assembly of the invention moved into a stowed position.
FIG. 8 is an enlarged, cross-sectional view taken along lines 8-8 of FIG. 4.

Pivotally connected to the first and second spaced-apart side members 26 and 32 for pivotal movement relative thereto between a first stowed position shown in FIG. 7 and a second deployed position shown in FIGS. 1 and 4 is a foot support assembly generally designated by the numeral 42. As best seen in FIG. 2 of the drawings, foot support assembly 42 comprises a first connector member 44 having an outwardly extending stop pin 46 that is closely receivable within the arcuate-groove 28 formed in first side member 26 (See FIG. 3). Stop pin 46 and arcuate-groove 28 form a part of the stop means of the invention for controlling the extent of pivotal movement of the foot assembly 42 relative to the first and second side members 26 and 32. Connector member 44 also has a generally centrally disposed, threaded-bore 48 for threadably receiving the threaded end portion 38c of first pivot pin 38 (FIG. 3).

Foot support assembly 42 also comprises a second connector member 50 having a generally centrally disposed, threaded-bore for threadably receiving the threaded end portion of second pivot pin 40. As best seen in FIG. 2, first connector member 44 is provided with a pair of spaced-apart, elongated first slots 44a and 44b. Second connector member 50 is also provided with a similar pair of spaced-apart, elongated second slots (not shown).

Connected to and spanning first and second spaced-apart connector members 44 and 50 is a generally planar foot support 54. Foot support 54 has a first end 54a provided with a pair of spaced-apart, elongated first protuberances 56a and 56b that are receivable within slots 44a and 44b (FIG. 2). Similarly, planar foot support 54 has a second end 54b provided with a pair of spaced-apart, elongated second protuberances 58a and 58b receivable within the pair of spaced-apart, elongated second slots formed in the second connector member 50. With this construction, the planar foot support can be secured to connector members 44 and 50 in the manner shown in FIG. 1 to form a rigid support for the feet of the passengers.

Forming an important aspect of the present invention is a pair of connector assemblies of novel construction that function to connect side members 26 and 32 to connector brackets 22 and 23. As shown in FIGS. 2, 3 and 5 of the drawings, each connector assembly of the pair of connector assemblies comprises an internally threaded member 25b having a generally hexagonally configured head portion 27 that is closely receivable within generally oval-shaped, locking cavities 65 formed in the pair of transversely spaced-apart connector brackets 22 and 23 (see for example FIGS. 3, 4 and 6).

Each connector assembly of the pair of connector assemblies also comprises an externally threaded member 25a that is threadably connected to internally threaded member 25b in the manner indicated in FIGS. 5 and 6. Each connector assembly of the pair of connector assemblies further comprises conventional friction washers, 61 and 63, the purpose of which will presently be described. As illustrated in the drawings, each of the connector arms 26 and 32 is provided with spaced-apart, generally circular shaped, washer receiving cavities 67 that closely receive the friction washers 61 and 63 (see for example FIG. 3).

It is important to note that each of the externally threaded members 25a of each of the connector assemblies has a tapered head 26a that is provided with an Allen wrench "W" (FIG. 5) receiving socket 26b (FIG. 6).

With the construction described in the preceding paragraphs, when the connector assemblies are assembled in the manner shown in FIGS. 5 and 6 of the drawings with the hexagonal heads 27 of the internally threaded members locked against rotation within oval-shaped opening 65, externally threaded member 25a can be readily tightened relative to internally threaded member 25b through the use of the Allen wrench "W" (FIG. 5). In this way an appropriate amount of pressure can be exerted against friction washers cavities 67, which circumscribe externally threaded member 25a, so as to thereby controllably adjust the force necessary to move the arms 26 and 32 from the stowed position shown in FIG. 7 to the deployed position shown in FIG. 4. Because of the novel construction of the connector assemblies and because hexagonal heads 27 of the internally threaded members are securely located within opening 65, once the unit is tightened, it cannot loosen due to continued movement of the arms 26 and 32 from the stowed position to the deployed position. This important feature of the invention comprises a substantial improvement over prior art devices of similar construction and function.

Figure 9:
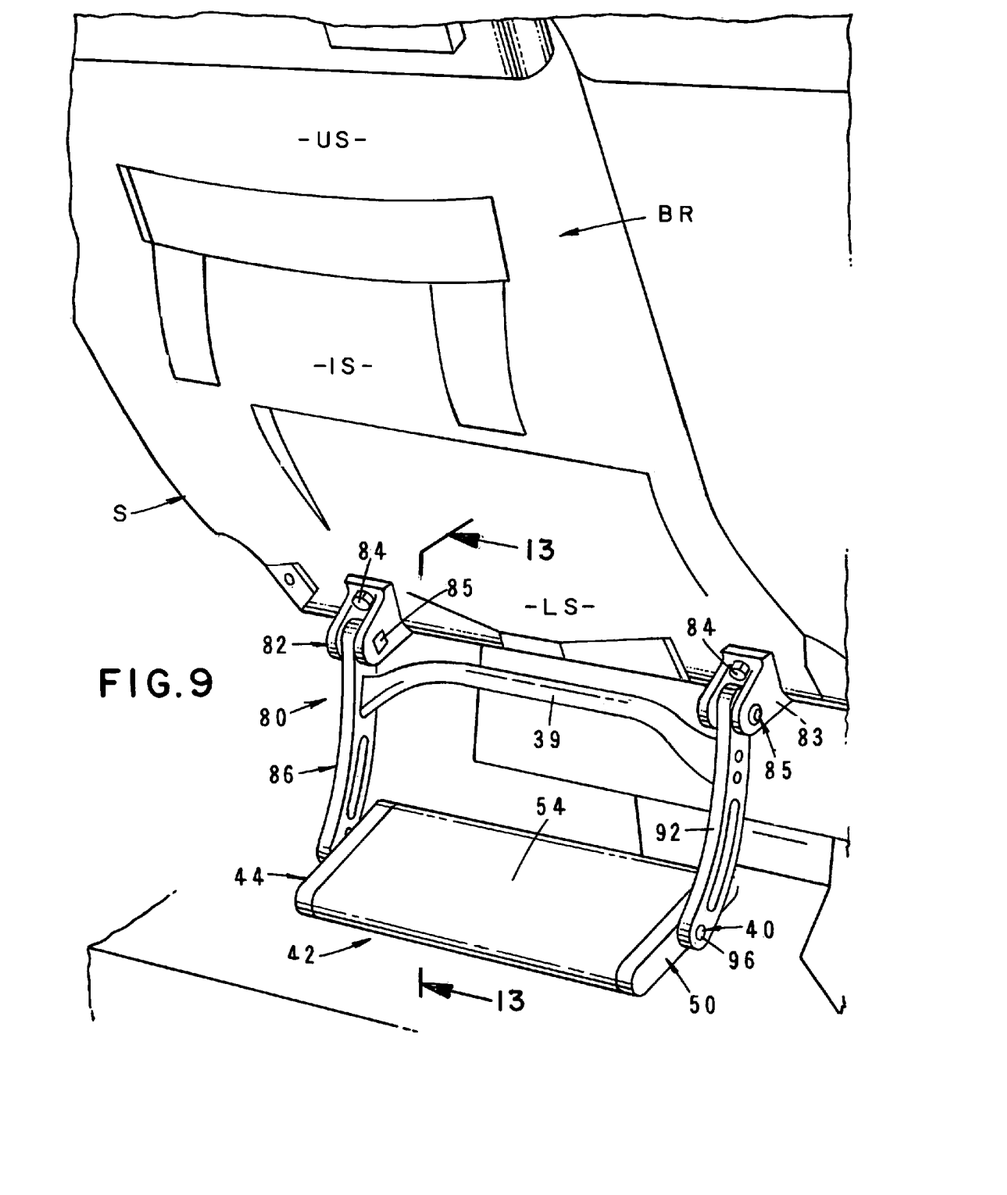
FIG. 9 is a fragmentary, generally perspective, rear view of an aircraft passenger seat showing an alternate form of the footrest assembly of the invention interconnected with the passenger seat and moved into a deployed position.
Figures 10, 12:
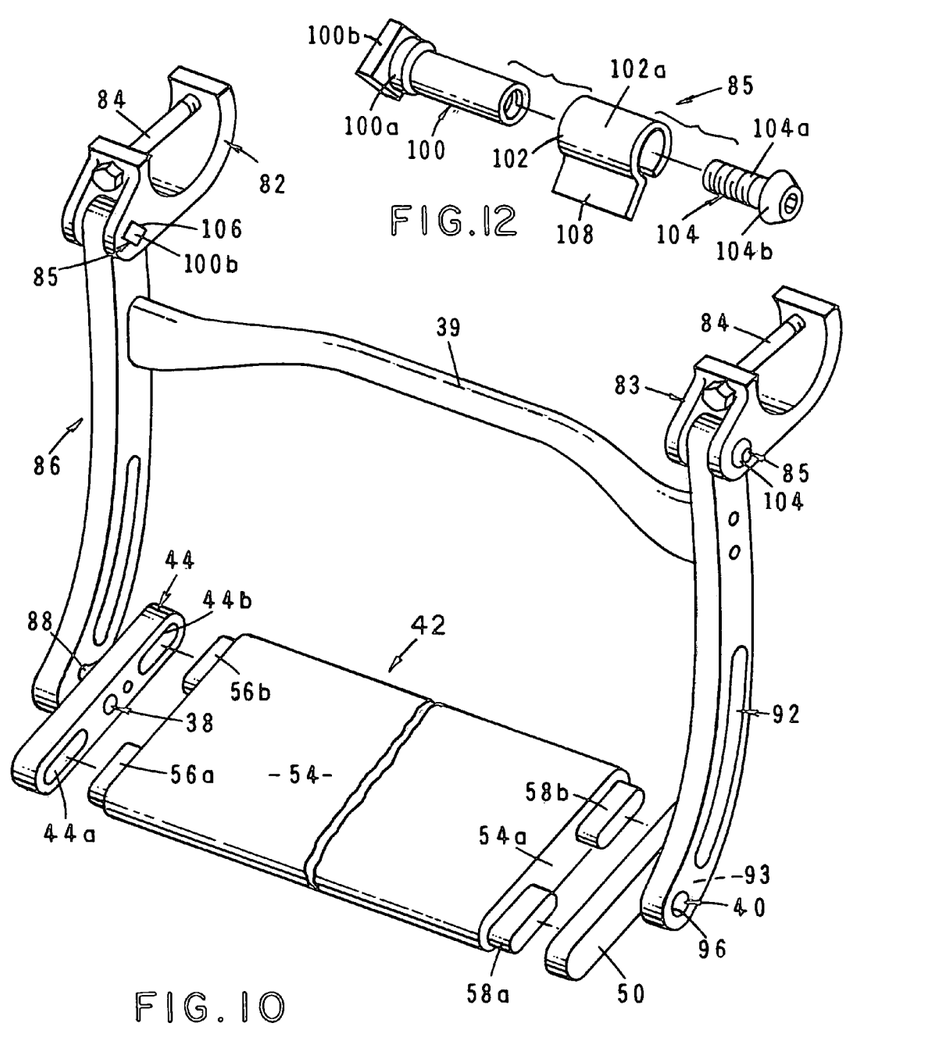
FIG. 10 is a generally perspective, partially exploded view of the form of the footrest assembly of the invention illustrated in FIG. 9.
FIG. 12 is an enlarged, generally perspective exploded view of one of the three part connector assemblies of the form of the footrest assembly of the invention illustrated in FIG. 9.
Figures 17, 18:
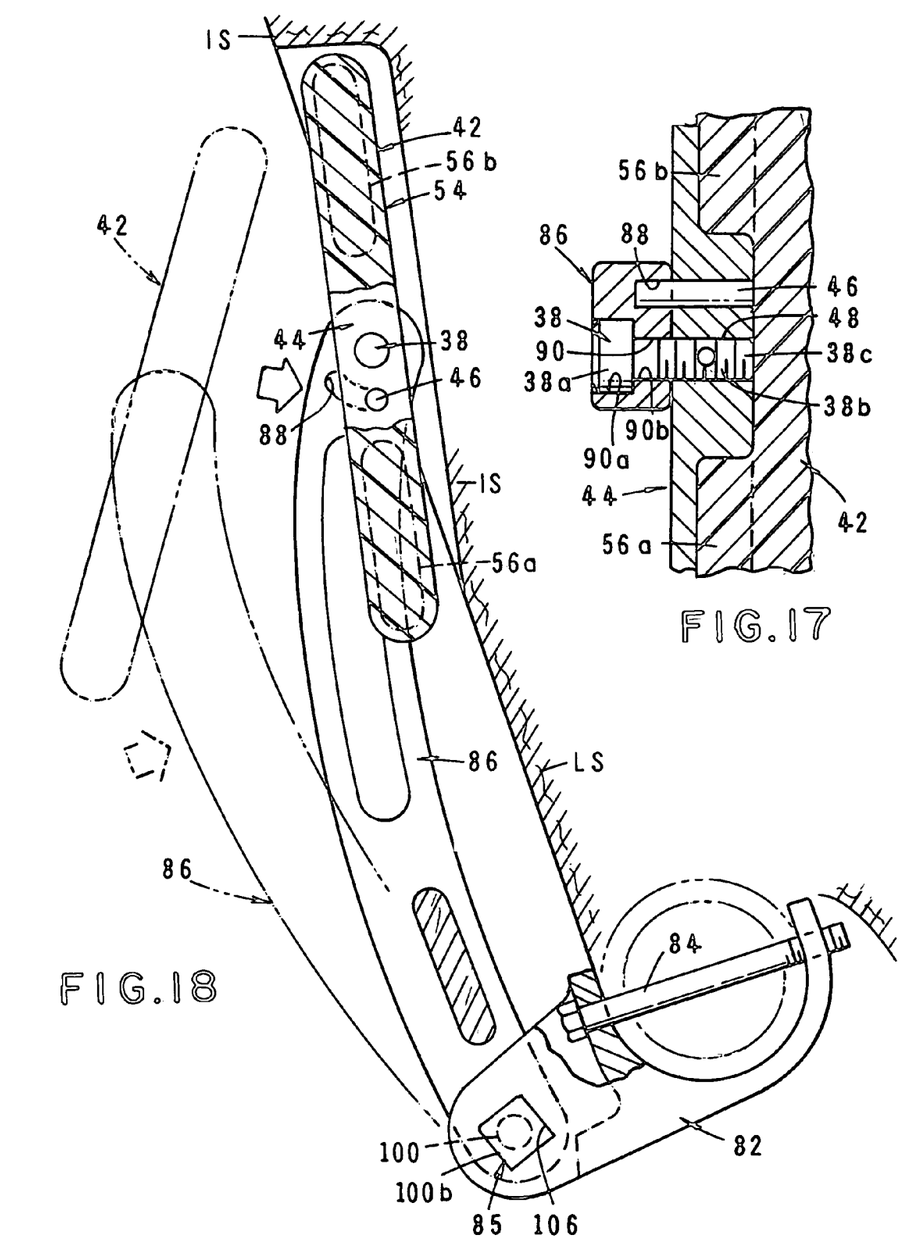
FIG. 17 is an enlarged, cross-sectional view taken along lines 17-17 of FIG. 13.
FIG. 18 is an enlarged, cross-sectional view, similar to FIG. 13, but showing the footrest assembly of the invention moved into a stowed position.

Referring next to FIGS. 9 through 18, an alternate form of the footrest of the invention is there shown and generally designated by the numeral 80. The footrest of this latest form of the invention is similar in many respects to the embodiment shown in FIGS. 1 through 8 and like numerals are used in FIGS. 9 through 18 to identify like components. As before, footrest 80 designed to be used in combination with an aircraft passenger seat "S" that includes a backrest "BR" having a rear upper surface "US", a rear lower surface "LS" and a rear intermediate surface "IS". As best seen in FIG. 9, the footrest here comprises first and second spaced-apart connector brackets 82 and 83 that are connected to the rear lower surface "LS" of the passenger seat "S" by conventional threaded connectors 84 (FIGS. 9 and 10). Pivotally connected to first connector bracket 82 by means of a novel three-part connector assembly 85 is a first side member 86 that is movable relative thereto between a first lowered position shown in FIG. 9 and a second upraised position shown in FIG. 18. For a purpose presently to be described, first side member 86 is provided with an arcuate-groove 88 and a through-bore 90 having an enlarged diameter portion 90a and a reduced diameter portion 90b (FIG. 17). Pivotally connected to second connector bracket 83 is a second side member 92 that is movable along with first side member 86 between a first lowered position shown in FIG. 9 and a second upraised position. Second side member 92 is also provided with an arcuate-groove 93 and a through-bore 96 that is of similar configuration to through-bore 90. A cross brace 39 is connected to and spans members 86 and 92 (FIGS. 9 and 10).

Figures 11, 16:
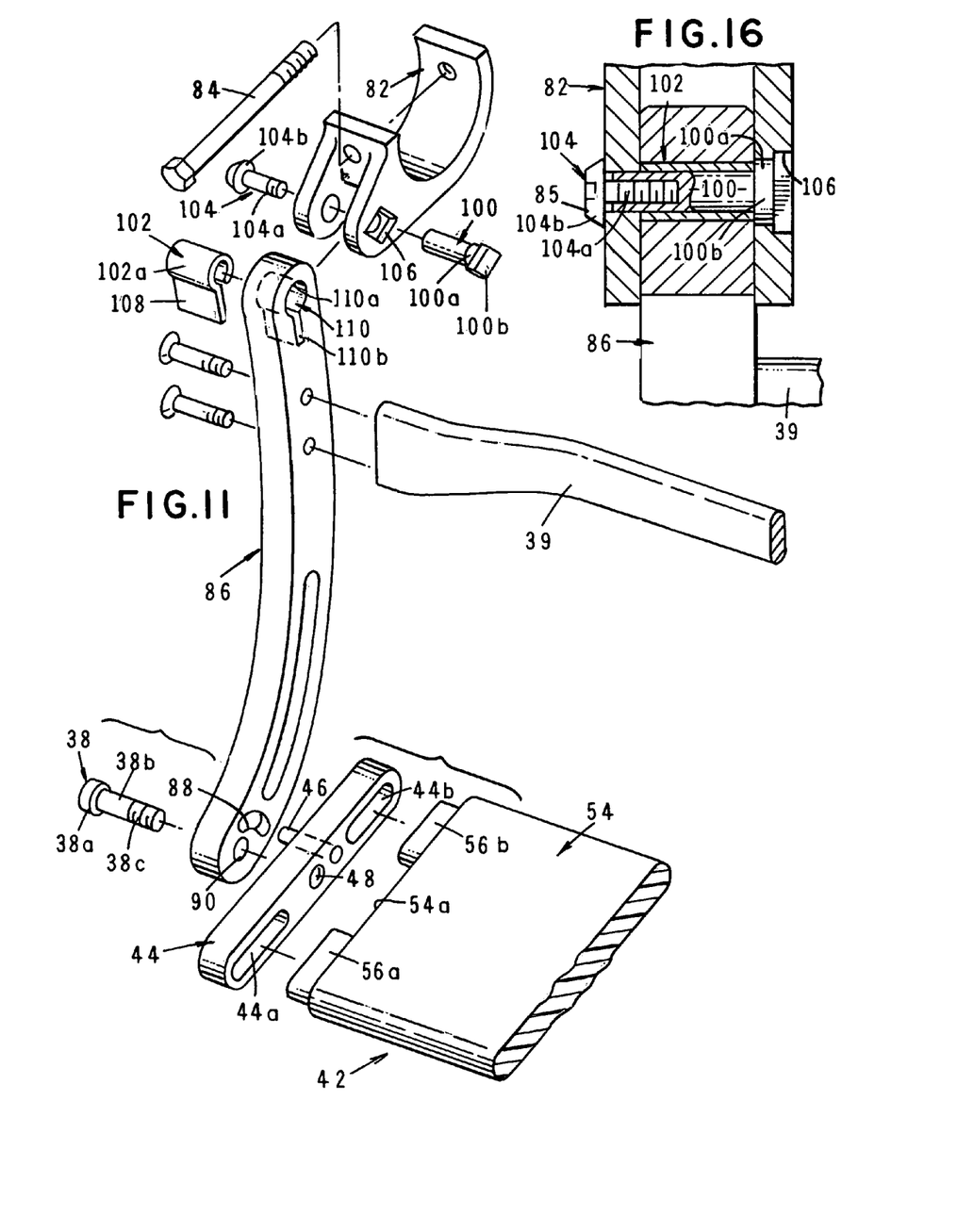
FIG. 11 is a greatly enlarged, generally perspective, partially exploded view of the left hand portion of the footrest assembly shown in FIG. 10.
FIG. 16 is an enlarged, cross-sectional view taken along lines 16-16 of FIG. 13.

Also forming a part of the footrest of this latest form of the invention are first and second pivot pins 38 and 40. Pivot pin 38 has a head portion 38a, a shank portion 38b and a threaded end portion 38c. As shown in FIGS. 11 and 17, pivot pin 38 is receivable within the through-bore 90 of the first side member 86, so that the head portion 38a resides within enlarged diameter portion 90a and the shank portion 38b resides within reduced diameter portion 90b. Second pivot pin 40, which is of similar construction to pivot pin 38, is receivable within the through-bore 96 of the second side member 92 in the manner indicated in FIG. 9.

Figures 13, 14, 15:
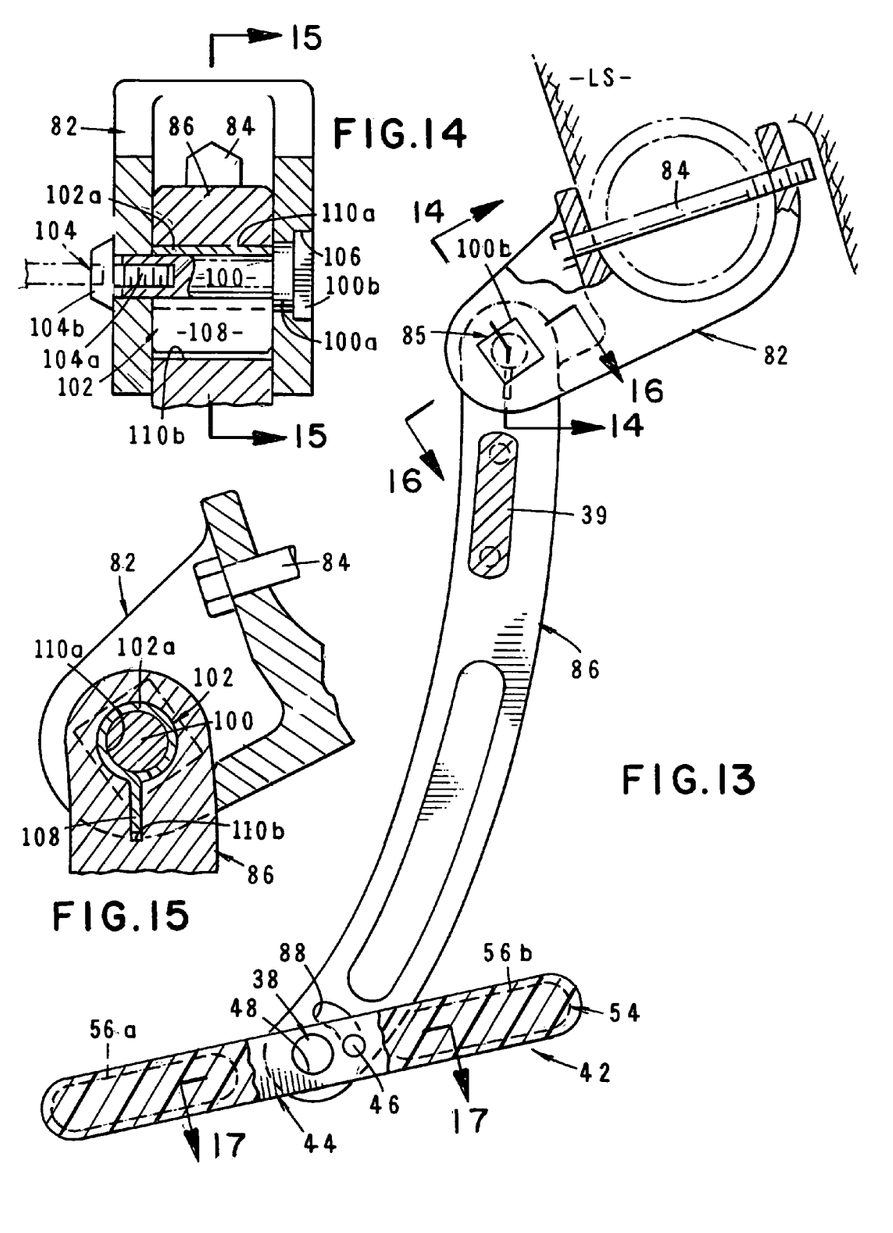
FIG. 13 is an enlarged, cross-sectional view taken along lines 13-13 of FIG. 9.
FIG. 14 is an enlarged, cross-sectional view taken along lines 14-14 of FIG. 13.
FIG. 15 is a cross-sectional view taken along lines 15-15 of FIG. 14.

Pivotally connected to the first and second spaced-apart side members 86 and 92 for pivotal movement relative thereto between a first stowed position shown in FIG. 18 and a second deployed position shown in FIGS. 9 and 13 is a foot support assembly generally designated by the numeral 42. As best seen in FIG. 11 of the drawings, foot support assembly 42 comprises a first connector member 44 having an outwardly extending stop pin 46 that is closely receivable within the arcuate-groove 88 formed in first side member 86 (See FIG. 11). Stop pin 46 and arcuate-groove 88 form a part of the stop means of the invention for controlling the extent of pivotal movement of the foot assembly 42 relative to the first and second side members 86 and 92. Connector member 44 also has a generally centrally disposed, threaded-bore 48 for threadably receiving the threaded end portion 38c of first pivot pin 38 (FIG. 11).

Foot support assembly 42 also comprises a second connector member 50 having a generally centrally disposed, threaded-bore for threadably receiving the threaded end portion of second pivot pin 40. As best seen in FIG. 10, first connector member 44 is provided with a pair of spaced-apart, elongated first slots 44a and 44b. Second connector member 50 is also provided with a similar pair of spaced-apart, elongated second slots (not shown).

Connected to and spanning first and second spaced-apart connector members 44 and 50 is a generally planar foot support 54. Foot support 54 has a first end 54a provided with a pair of spaced-apart, elongated first protuberances 56a and 56b that are receivable within slots 44a and 44b (FIG. 10). Similarly, planar foot support 54 has a second end 54b provided with a pair of spaced-apart, elongated second protuberances 58a and 58b receivable within the pair of spaced-apart, elongated second slots formed in the second connector member 50. With this construction, the planar foot support can be secured to connector members 44 and 50 in the manner shown in FIG. 9 to form a rigid support for the feet of the passengers.

Forming an important aspect of the present invention is the previously identified three part connector assemblies 85 that function to connect side members 86 and 92 to connector brackets 82 and 83 in the manner shown in FIG. 9. As illustrated in FIGS. 11 and 12 of the drawings, each connector assembly 85 of the pair of connector assemblies comprises an internally threaded shaft 100 having an enlarged diameter portion 100a and a generally rectangular head portion 100b, an integrally formed restraining member 102 rotatably connected to shaft 100 and a connector member 104 having an externally threaded shaft 104a and a head portion 104b. The connector assemblies 85 are commercially available from Hanaya Inc. of Scarsdale, N.Y. As illustrated in FIG. 11 of the drawings the rectangular head portion 100b of internally threaded shaft 100 of one of the connector assemblies 85 is closely receivable within a rectangular locking cavity 106 formed in connector bracket 82. Similarly, the rectangular head portion 100b of internally threaded shaft 100 of the other of the connector assemblies 85 is closely receivable within a similar rectangular locking cavity formed in connector bracket 83. Restraining member 102, which is preferably constructed from spring steel, has a body portion 102a that is press fit to and closely circumscribes shaft 100 in the manner shown in FIG. 15 to create a friction interference fit. Integrally formed with portion 102a and extending outwardly therefrom is a restraining tab 108.

Each of the first and second side members 86 and 92 is provided with a generally keyhole shaped opening 110 that, as best seen in FIG. 11, comprises a through bore 110a and a slot 110b that extends outwardly from the through bore. As illustrated in FIG. 15, when the assemblies 85 are in position within keyhole shaped openings 110, restraining tab 108 of each of the restraining members extends into the slot 110b so as to yieldably resist movement of the first and second side members 86 and 92 from the first lowered position shown in FIG. 9 to the second upraised position. More particularly, as the first and second side members are moved toward the second stowed position, the restraining tabs 108 of each of the restraining members will urge the body portions 102a of the restraining members to rotate about the shafts 100 of the connector assemblies 85. However, because of the resistance to rotation of the body portions 102a relative to the shafts 100 caused by the friction resistance between the parts, a predetermined force must be exerted on the footrest in order to move it toward the second stowed position and also to return it to its extended position.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. In combination with a seat, including a seat portion and a backrest having a rear upper surface, a rear lower surface and a rear intermediate surface, a footrest assembly comprising:
    (a) a pair of transversely spaced-apart connector brackets connected to said rear lower surface of said backrest, each said connector bracket having a locking cavity formed therein;
    (b) a pair of side members pivotally connected to said connector brackets for movement relative thereto between a first lowered position and a second upraised position, each said side member of said pair of side members having a slot;
    (c) a pair of connector assemblies connecting said side members to said pair of connector brackets, each said connector assembly of said pair of connector assemblies comprising:
        (i) a shaft having a head portion closely receivable within said locking cavity formed in selected one of said pair of transversely spaced-apart connector brackets; and
        (ii) a restraining member connected to said shaft, said restraining member having a body portion circumscribing said shaft and an outwardly extending restraining tab connected to said body portion and extending into said slot formed in a selected one of said pair of side members; and
    (d) a foot support assembly pivotally connected to each of said spaced-apart side members.

2. The combination as defined in claim 1 in which said head portion of each of said shafts is rectangular and in which said locking cavity of each said connector bracket is rectangular.

3. The combination as defined in claim 1 in which each of said restraining members is connected to said shaft by a press fit.

4. The combination as defined in claim 1 in which said foot support assembly comprises:
   (a) a pair of transversely spaced-apart connector members; and
   (b) a generally planar foot support connected to and spanning said spaced-apart connector members, said pair of transversely spaced-apart connector members being pivotally movable relative said spaced-apart side members between a first stowed position wherein said connector members are generally parallel with said spaced-apart side members to a second deployed position wherein said connector members are angularly inclined relative to said spaced-apart side members.

5. The combination as defined in claim 4 in which each of said spaced-apart side members is provided with an arcuate-groove and in which each of said spaced-apart connector members is provided with an outwardly extending pin that is closely receivable within said arcuate groove.

6. The combination as defined in claim 5 in which said foot support assembly further comprises a pair of pivot pins, each having a shank portion and a threaded end portion and in which each of said spaced-apart connector members is provided with a generally centrally disposed threaded-bore for threadably receiving said threaded end portion of a selected one of said pair of pivot pins.

7. The combination as defined in claim 6 in which each of said spaced-apart side members is provided with a through-bore for receiving a selected one of said pair of pivot pins.

8. In combination with a seat, including a seat portion and a backrest having a rear upper surface, a rear lower surface and a rear intermediate surface, a footrest assembly comprising:
   (a) a pair of transversely spaced-apart connector brackets connected to said rear lower surface of said backrest, each said connector bracket having a locking cavity formed therein;
   (b) a pair of side members pivotally connected to said connector brackets for movement relative thereto between a first lowered position and a second upraised position, each said side member of said pair of side members having a slot;
   (c) a pair of connector assemblies connecting said side members to said pair of connector brackets, each said connector assembly of said pair of connector assemblies comprising:
      (i) a shaft having a head portion closely receivable within said locking cavity formed in selected one of said pair of transversely spaced-apart connector brackets; and
      (ii) an integrally formed restraining member rotatably connected to said shaft by a press fit, said restraining member having a body portion circumscribing said shaft and an outwardly extending restraining tab connected to said body portion and extending into said slot formed in a selected one of said pair of side members; and
   (d) a foot support assembly pivotally connected to each of said spaced-apart side members.

9. The combination as defined in claim 8 in which said foot support assembly comprises:
   (a) a pair of transversely spaced-apart connector members; and
   (b) a generally planar foot support connected to and spanning said spaced-apart connector members, said pair of transversely spaced-apart connector members being pivotally movable relative said spaced-apart side members between a first stowed position wherein said connector members are generally parallel with said spaced-apart side members to a second deployed position wherein said connector members are angularly inclined relative to said spaced-apart side members.

10. The combination as defined in claim 9 in which said head portion of each of said shafts is rectangular and in which said locking cavity of each said connector bracket is rectangular.

11. In combination with a seat, including a seat portion and a backrest having a rear upper surface, a rear lower surface and a rear intermediate surface, a footrest assembly comprising:
    (a) a pair of transversely spaced-apart connector brackets connected to said rear lower surface of said backrest, each said connector bracket having a generally rectangular shaped locking cavity formed therein;
    (b) a pair of side members pivotally connected to said connector brackets for movement relative thereto between a first lowered position and a second upraised position, each said side member of said pair of side members having a slot;
    (c) a pair of connector assemblies connecting said side members to said pair of connector brackets, each said connector assembly of said pair of connector assemblies comprising:
       (i) a shaft having a head portion closely receivable within said locking cavity formed in selected one of said pair of transversely spaced-apart connector brackets; and
       (ii) an integrally formed restraining member rotatably connected to said shaft by a press fit, said restraining member having a body portion circumscribing said shaft and an outwardly extending restraining tab connected to said body portion and extending into said slot formed in a selected one of said pair of side members; and
    (d) a foot support assembly pivotally connected to each of said spaced-apart side members, said foot support assembly comprising:
       (i) a pair of transversely spaced-apart connector members; and
       (ii) a generally planar foot support connected to and spanning said spaced-apart connector members, said pair of transversely spaced-apart connector members being pivotally movable relative said spaced-apart side members between a first stowed position wherein said connector members are generally parallel with said spaced-apart side members to a second deployed position wherein said connector members are angularly inclined relative to said spaced-apart side members.

\* \* \* \* \*